United States Patent [19]

Napoli

[11] Patent Number: 5,233,828
[45] Date of Patent: Aug. 10, 1993

[54] COMBUSTOR LINER WITH CIRCUMFERENTIALLY ANGLED FILM COOLING HOLES

[75] Inventor: Phillip D. Napoli, West Chester, Ohio

[73] Assignee: General Electric Company, Cincinnati, Ohio

[21] Appl. No.: 951,025

[22] Filed: Sep. 24, 1992

Related U.S. Application Data

[63] Continuation of Ser. No. 614,368, Nov. 15, 1990, abandoned.

[51] Int. Cl.$^5$ ............................ F02C 3/00; F23R 3/06
[52] U.S. Cl. ........................................ 60/261; 60/755; 60/757
[58] Field of Search ................. 60/752, 754, 755, 756, 60/757, 267; 431/352

[56] References Cited

U.S. PATENT DOCUMENTS

| | | | |
|---|---|---|---|
| 2,576,046 | 11/1951 | Scarth | 60/755 |
| 3,420,058 | 1/1969 | Howald et al. | |
| 3,527,543 | 9/1970 | Howald | |
| 3,623,711 | 11/1971 | Thorstenson | |
| 4,232,527 | 11/1980 | Reider | |
| 4,642,993 | 2/1987 | Sweet | |
| 4,653,983 | 3/1987 | Vehr | |
| 4,664,597 | 5/1987 | Auxier et al. | |
| 4,687,436 | 8/1987 | Shigeta | 431/352 |
| 4,695,247 | 9/1987 | Enzaki et al. | |
| 4,696,431 | 9/1987 | Buxe | |
| 4,773,593 | 9/1988 | Auxier et al. | |
| 4,833,881 | 5/1989 | Vdoviak et al. | |
| 4,848,081 | 7/1989 | Kennedy | 60/261 |
| 4,878,283 | 11/1989 | McLean | |
| 4,896,510 | 1/1990 | Foltz | |
| 4,923,371 | 5/1990 | Ben-Amoz | |

FOREIGN PATENT DOCUMENTS

90/07087 6/1990 PCT Int'l Appl.
2221979 2/1990 United Kingdom.

OTHER PUBLICATIONS

Multihole Cooling Film Effectiveness and Heat Transfer, by R. E. Mayle and F. J. Camarata—Transactions of the ASME—Nov., 1975.
Alternate Cooling Configuration for Gas Turbine Combustion Systems, by D. A. Nealy, S. B. Reider, H. C. Mongia—Allison Gas Turbine Divn., Prepared by Advisory Group for Aerospace Research & Development 65th Meeting—May 6-10, 1985.
NASA-CR-159656—Advanced Low—Emissions Catalytic—Combustor Program—Phase I Final Report by G. J. Sturgess—Jun. 1981 report.

Primary Examiner—Richard A. Bertsch
Assistant Examiner—Timothy S. Thorpe
Attorney, Agent, or Firm—Jerome C. Squillaro; James P. Davidson

[57] ABSTRACT

A gas turbine engine combustor is provided, having a an annular single wall sheet metal liner which is generally annular in shape and having disposed therethrough a multi-hole film cooling means which includes at least one pattern of small closely spaced film cooling holes angled sharply in the downstream direction and angled in a circumferential direction wherein the circumferential angle generally coincides with the swirl angle of the flow along the surface of the liner. Another embodiment provides a corrugated aircraft engine sheet metal combustor liner which forms an axially extending wavy wall to help resist buckling, particularly useful for outer liners in the combustion section of the engine and in the exhaust section of gas turbine engines incorporating afterburners.

12 Claims, 3 Drawing Sheets

COMBUSTOR LINER WITH CIRCUMFERENTIALLY ANGLED FILM COOLING HOLES

This application is a continuation of application Ser. No. 07/614,368, filed Nov. 15, 1990, now abandoned.

BACKGROUND OF THE INVENTION

1. Field of the Invention

This invention relates to film cooled combustor liners for use in gas turbine engines, and more particularly, to aircraft gas turbine engine combustor liners having cooling holes that are angled in the circumferential direction.

2. Description of Related Art

Combustor liners are generally used in the combustion section of a gas turbine engine which is located between the compressor and turbine sections of the engine. Combustor liners are also used in the exhaust section of aircraft engines that have afterburners. Combustors generally include an exterior casing and an interior combustor wherein fuel is burned producing a hot gas usually at an intensely high temperature such as 3,000° F. or even higher. To prevent this intense heat from damaging the combustor before it exits to a turbine, a heat shield or combustor liner is provided in the interior of the combustor. This combustor liner thus prevents the intense combustion heat from damaging the combustor or surrounding engine.

Prior methods for film cooling combustion liners provided circumferentially disposed rows of film cooling slots such as those depicted in U.S. Pat. No. 4,566,280 by Burr and U.S. Pat. No. 4,733,538 by Vdoviak et al. which are typified by complex structures that have non-uniform liner thicknesses which give rise to thermal gradients which cause low cycle fatigue in the liner and therefore shorten their potential life expectancy and reduce their durability. The complex shapes and machining required to produce these liners negatively effects their cost and weight.

A more detailed discussion of the related art may be found in a related U.S. patent application Ser. No. 07/614,418 entitled "GAS TURBINE ENGINE MULTI-HOLE FILM COOLED COMBUSTOR LINER AND METHOD OF MANUFACTURE", invented by Wakeman et al., filed Nov. 15, 1990, assigned to the same assignee, and incorporated herein by reference.

Engine designers have long sought to incorporate low weight single wall combustor liners capable of withstanding the temperatures and pressure differentials found in combustors. To that end the invention described in the Wakeman reference provides a single wall, preferably sheet metal, annular combustor liner having multi-hole film cooling holes which are disposed through the wall of the liner at sharp downstream angles. The multi-hole film cooling holes are spaced closely together to form at least one continuous pattern designed to provide film cooling over the length of the liner. The present invention provides multi-hole film cooling holes which have a diameter of about 20 mils with a nominal tolerance of about ±2 mils, are spaced closely together about 6½ to 7½ hole diameters apart, have a downstream angle of 20 degrees with a nominal tolerance of about ±1 degree, and a circumferential angle with respect to the engine center-line of between 30 and 65 degrees. Axially adjacent holes are circumferentially offset by half the angle between circumferentially adjacent holes to further enhance the evenness of the cooling film injection points. The Wakeman invention further provides an embodiment wherein the combustor liner may be corrugated so as to form a way wall which is designed to prevent buckling and is particularly useful for outer burner liners in the combustion section of gas turbine engines and exhaust duct burner liners in aircraft gas turbine engines having afterburners.

A phenomena which occurs both in the main combustion section and in the afterburner combustion section is swirl, wherein swirled patterns of higher thermal degredation areas are formed on the liner. The patterns generally coincide with the swirl of the combustor flow induced by swirlers in the fuel nozzles to promote better combustion and in the exhaust section by turbine nozzles.

SUMMARY OF THE INVENTION

The present invention provides a multi-hole film cooling means similar to that described in the Wakeman reference wherein the film cooling effectiveness is improved by angling or clocking the cooling holes in the circumferential direction which is best accomplished by drilling the holes so that the axis of the cooling hole is 30 to 65 degrees to the combustor flow path. The orientation of clocking is preferably in the direction of the combustor swirl pattern as may be generated by the dome swirlers and stage 1 high pressure turbine nozzle inlets. In accordance with one embodiment of the present invention, the combustor liner may be corrugated so as to form a way wall which is designed to prevent buckling and is particularly useful for outer burner liners in the combustion section of gas turbine engines and exhaust duct burner liners in aircraft gas turbine engines having afterburners.

ADVANTAGES

Clocking of the cooling holes in this fashion will impart a tangential velocity component to the cooling air exiting the multi-hole film cooling hole and reduce its axial velocity component. This change in velocity vectors relative to the baseline or unclocked configuration will enhance the formation of hot side cooling film formed by the hole exit air. This is accomplished by providing for (1) more uniform film coverage, (2) increasing film residence time as it traverses the liner gas side flow path, and (3) reducing the stress concentration factor by aligning the major axis of the naturally formed elliptical shaped hole exit plane in a more favorable orientation relative to the engine center-line. This will also promote better hot gas side film coverage. The present invention provides a means that allows a reduction in liner cooling flow and improved performance for pattern and profile limited engines and or reduced metal temperatures for endurance limited engines.

Combustor liners made in accordance with the present invention dramatically reduces the radial temperature gradients typically found in conventional nugget or panel film cooled combustor liners. Reduction of these radial gradients result in a consequent reduction in thermal hoop stress and improved Low Cycle Fatigue life. The use of a simple wave form, as found in conventional augmenting liners, may be used in the outer liner of the combustion section of the engine, as well as the augmenting liner, to provide a low cost means of imparting buckling resistance to the combustor liner.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
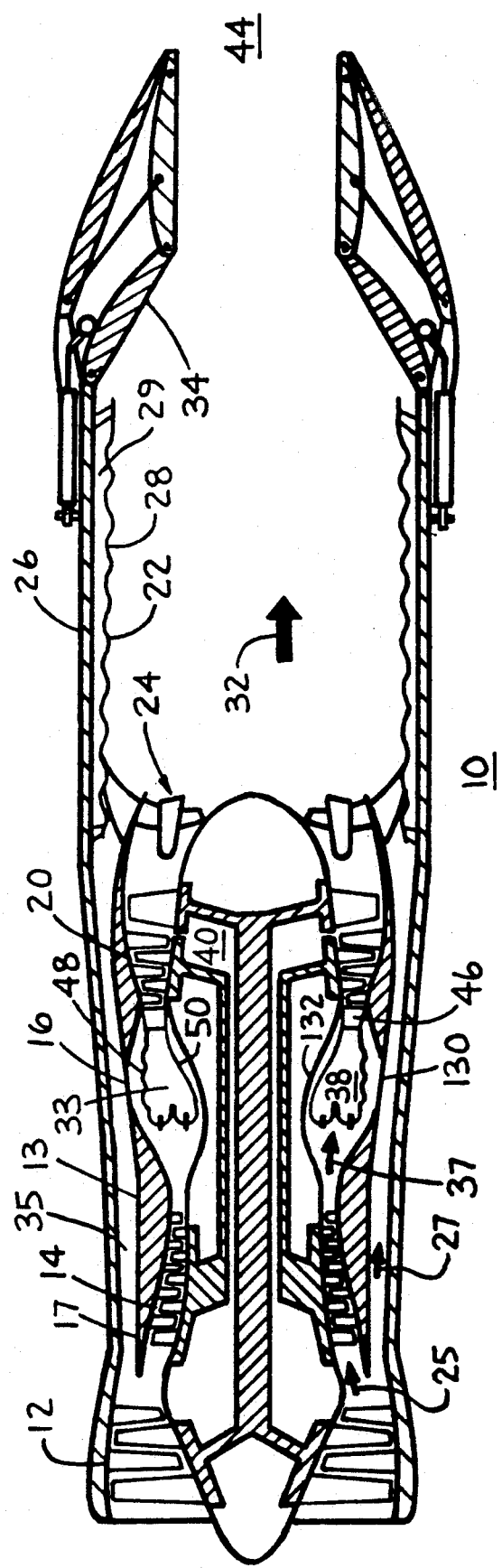
FIG. 1 is a diagrammatic view of a typical gas turbine engine including a core engine combustion section and an afterburning exhaust section having combustor liners in accordance with the present invention.

The gas turbine engine of FIG. 1 represents a conventional aircraft gas turbine engine having a combustion section combustor and afterburner employing combustor liners of the present invention.

Referring to FIG. 1, a typical gas turbine engine 10 is shown comprising a fan section 12 which is in serial flow relationship with an engine core 13 and with a by-pass duct 35 which is generally disposed, in concentric fashion, about the engine core. Flow from engine core 13 and by-pass duct 35 is discharged to an exhaust section 22 having a nozzle 34 used to help produce thrust. splitter 17 by-passes a portion of the air flow 27, referred to as by-pass flow, from fan section 12 through by-pass duct 35 around engine core 13. The remaining airflow, referred to as core air flow 25, is compressed by compressor 14 and discharged to a combustion section 16 which includes axially and circumferentially extending outer and inner combustor liners 48 and 50, respectively. Outer and inner combustor liners 48 and 50 are radially spaced from each other to define a portion of annular combustion flow path or combustion zone 33 therebetween where a portion of core flow 25 is mixed with fuel and the resultant mixture is combusted. The combustion section produces hot combustion gases which are mixed with the remainder of the compressor discharge flow and the resultant heated effluent is then flowed to turbine section 20 which powers compressor section 14 and fan section 12.

An afterburner 24, as illustrated in FIG. 1, is disposed in exhaust section 22 downstream of turbine section 20 and is operable for burning additional fuel with bypass air 27 and core flow 25 in order to augment or produce additional thrust. Thrust augmentation is particularly useful in military aircraft for short periods of time such as during takeoff, climb and during combat maneuvers. Exhaust section 22 contains gas flow 32 which is circumscribed by an annular case 26 and an annular afterburner liner 28 radially inward of casing 26, and a cooling plenum 29 therebetween. The afterburner may also be referred to as an augmenter. Outer and inner combustor liners 48 and 50 and afterburner liner 28 provide some generally similar functions. They contain the hot combustion gases and provide a flowpath suitable to promote efficient combustion. Pressurized air enters combustion section 16 where it is mixed with fuel and burned. The hot gases of combustion, which may in some gas turbine engines exceed 3000° F. exit combustion section 16, flow thereafter past turbine blades 46 and through the remaining portion of turbine section 20. The hot gases are then expelled at a high velocity from the engine 10 through exhaust nozzle 34, whereby the energy remaining therein provides thrust generation by engine 10.

Figure 2:
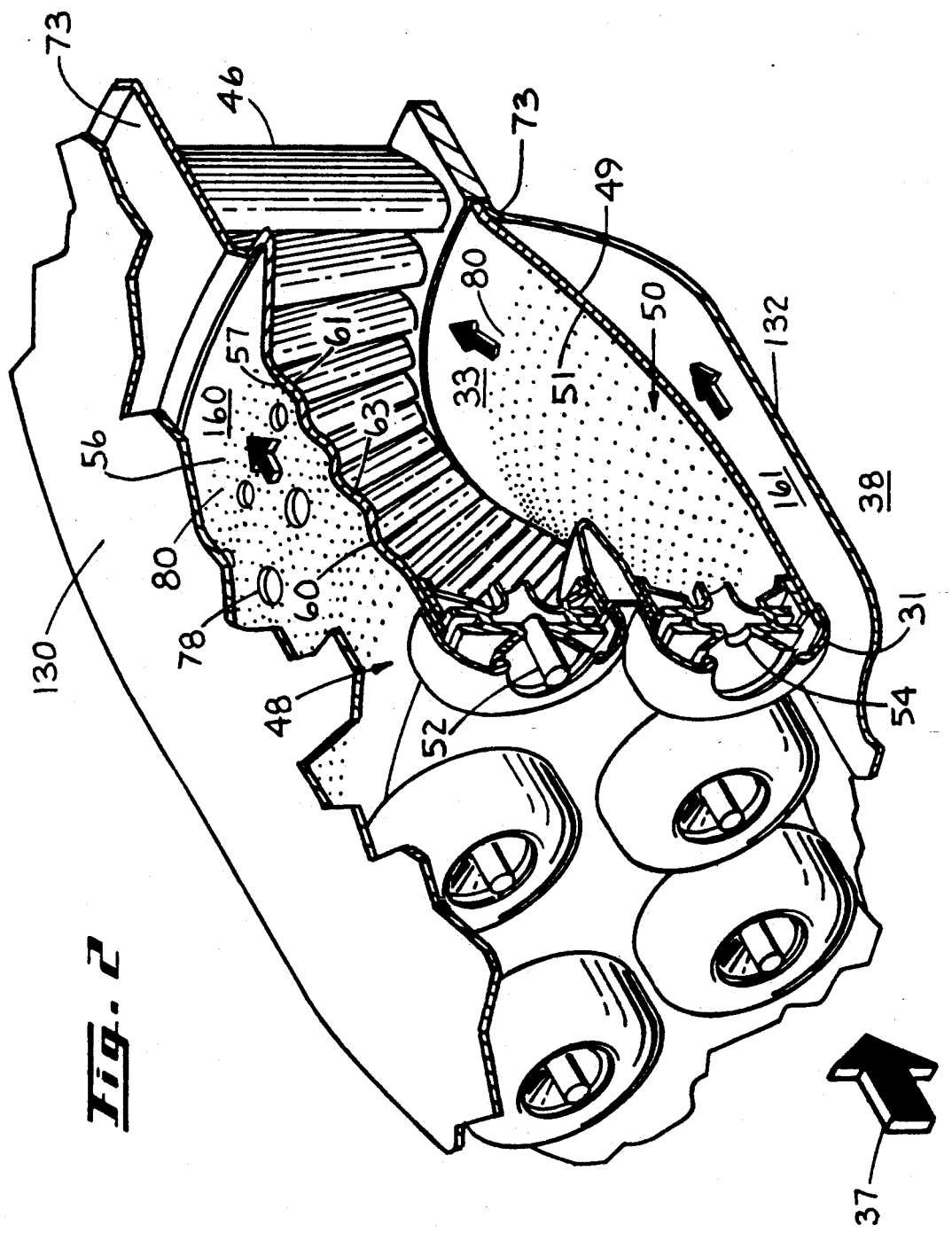
FIG. 2 is a perspective view of the core engine combustion section of the engine depicted in FIG. 1.

Referring now to FIG. 2, a perspective view of the combustion section 16 is depicted comprising a combustor assembly 38 positioned in the compressor discharge flow 37 between an outer combustor casing 130 and an inner combustor casing 132 in energized fluid supply communication with the turbine section denoted by turbine blades 46. Combustor assembly 38 is further comprised of axially and circumferentially extending outer and inner combustor liners 48 and 50, respectively, radially spaced from each other to define a portion of annular flow path or combustion zone 33 therebetween. Outer liner 48 and outer casing 130 form an outer combustor passage 160 therebetween and inner liner 50 and inner casing 132 form an inner passage 161 wherein said passages provide for receiving cool compressor discharge air. Disposed at the upstream end of combustor liners 48 and 50 is a plurality of fuel injectors 52 mounted within a plurality of apertures 54 in the combustor dome 31 of combustor assembly 38. Note, that combustor assembly 38 and outer and inner combustor liners 48 and 50 have a preferred annular configuration, extending circumferentially about the centerline of the engine and dome 31 is of the double dome type to accommodate the double annular ring of fuel injectors 52. Accordingly, fuel injectors 52 are circumferentially spaced from each other to provide a number of injection points for admitting a fuel/air mixture to combustor assembly 38 over the circumferential extent of annular combustion flow path 33.

The upstream ends of combustor liners 48 and 50 are formed with means to be attached to and axially and radially supported by combustor dome 31. Downstream ends 73 have radial support means such as interference fits or other conventional support means which provides radial support and allows for thermal growth of liners 48 and 50.

Outer liner 48 is preferably comprised of a single wall annular sheet or shell having a generally axially extending generally annular corrugations 60 which provides outer liner 48 with a wavy wall 63 cross-section. Outer liner 48 has a cold side 57 in contact with the relatively cool air outside combustion zone 33 and a hot side 61 facing the combustion zone and includes a means for providing multi-hole film cooling of liner 48.

Figure 3:
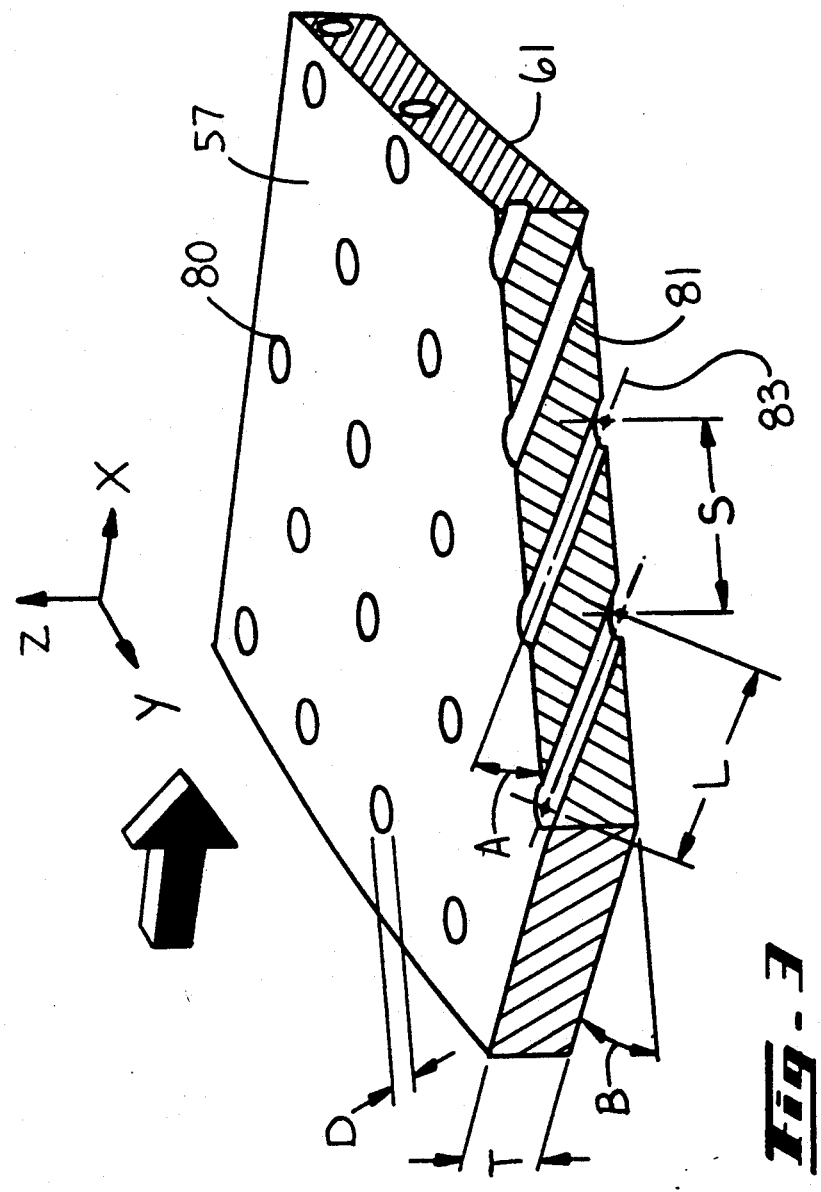
FIG. 3 is an enlarged perspective view of a portion of a combustor liner depicting multi-hole film cooling holes in a portion of a combustor liner in accordance with the preferred embodiment of the present invention.

Referrring to FIG. 3, a frame of reference is provided having axis labelled X, Y, and Z wherein X indicates the downstream direction of the flow along the surface of the liner, Y is in the circumferential direction, and Z is normal to the combustor liner surface on the surface of the liner. The means for providing multi-hole film cooling, shown in greater detail in FIG. 3, comprises a plurality of very narrow closely spaced sharply downstream (indicated by the arrow in FIG. 3) angled film cooling holes 80 which are axially rearward slanted from cold surface 57 to hot surface 61 of liner 48 at an angle in the range of about 15° to 20° and clocked or slanted in the circumferential direction, indicated by Y in the frame of reference, at a clock angle B corresponding to the swirl of the flow which is usually between 30 and 65 degrees with respect to the downstream direction of the flow indicated by the arrow.

We have found that from a manufacturing and cost standpoint a downstream slant angle A of about 20° is preferred with respect to either surface of liner 48. Smaller downstream slant angles A may be may be advantageous for improved cooling and therefore an alternative downstream slant angle A in the range of about 20° to 15° may be used if the associated costs are warranted. Downstream slant angles smaller than 15 degrees may weaken the liner structure. The holes have a preferred diameter of 20 mils (0.02 inches) and are preferably spaced about 150 mils (0.15 inches) off center from each other, as measured between their respective center-lines 83, or about six and one half (6½) hole diameters.

Similarly inner liner 50 is formed of a single wall annular sheet or shell having a plurality of very narrow closely spaced sharply slanted film cooling holes 80 which are axially rearward slanted from cold surface 49 to hot surface 51 of liner 50.

Dilution air is primarily introduced by a plurality of circumferentially extending spaced apart dilution apertures 78 disposed in each of inner and outer liners 48 and 50. Each aperture 78 and has a cross-sectional area of substantially greater than the cross-sectional area of one of the multi-hole cooling holes 80 and are generally far smaller in number. Dilution apertures 78 and to a smaller extent cooling holes 80 serve to admit additional air into combustor assembly 38. This additional air mixes with the air/fuel mixture from injectors 52 and, to some extent, will promote some additional combustion.

Referring to FIG. 3, liner thickness T, multi-hole film cooling hole spacing S (the distance between cooling hole center-lines 83), film cooling hole length L and diameter D, and cooling hole angle A of cooling holes 80 are a function of the cooling flow requirements to meet the durability characteristics of the particular engine in which it is used. Preferably, the combustor liners have a thermal barrier coating on their hot side 61 to further reduce the heat load into the liners. Cooling holes 80 are laser drilled holes. Typically combustor liner wall thickness T is sized to meet both mechanical loading requirements and to allow the cooling flow through cooling hole 80 to develop an adequate length to diameter ratio (L/D) of least 1.0 and preferably longer. This minimum L/D is required to form a good film and to maximize convective cooling along an internal cooling hole surface 81 within cooling hole 80. We have also found that the cooling holes should be spaced about 7 diameters apart from each other or between center-lines 83 of adjacent cooling holes 80. The process of laser drilling is preferably done by drilling the holes from hot side 61 to cold side 57 of the combustor liner, which for outer liner 48 and afterburner liner 28 is from the inside of the shell out, thereby producing a diffusion cooling hole having an outlet which is slightly wider than the cooling hole inlet. The diffusion of the cooling flow through cooling hole 80 provides a further advantage by enhancing the film cooling effectiveness which reduces the amount of cooling flow needed through cooling holes 80 and the pressure and engine performance losses associated with such cooling means. It may be preferable, particularly in the case of outer liners 48 resistance means such as corrugations 60 shown in FIGS. 1 and 2. Buckling of outer 48 liner due to inward pressure load is a primary design consideration. Small and medium diameter short length combustors may only require a reasonable liner thickness combined with its formed shape and end support provided by combustor dome 31 and stator seal to provide sufficient buckling margin. This margin can be increased by using significant axial curvature in the liner to increase its section modulus. Very large combustor liners, having about a 30 inch diameter or larger, such as outer liner 48 in combustion section 16 and long combustor liners such as afterburner liner 28 may require additional features to prevent buckling. The present invention provides corrugations 60 of outer liner 48 and afterburner liner 28 to restrict the liner deflection and resist buckling.

The buckling resistance imparted by the wave design of corrugations 60 is similar to that applied in augmenter liners and must be designed to provide that the film effectiveness of the liner is not adversely affected by the wave form. We have found that a shallow wavy form is preferred. An example of such a shallow wavy wall or corrugated liner is illustrated in the preferred embodiment which provides, for a combustor section outer liner 48 having a 30 inch diameter, a trough to crest depth along hot surface 51 of about 80 mils (0.08 inches) and a crest to crest length of about 900 mil (0.9 inches) We have found that such a configuration is very effective for maintaining the integrity of the cooling film and providing sufficient buckling resistance. The method of manufacturing combustor liners incorporating the features of the preferred embodiment of the present invention provides is best described in the above referenced patent application to Wakeman et al., as applied to an outer liner 48 for a combustion section 16 having a typical diameter of 30 inches which may typically contain over 20,000 holes.

While the preferred embodiment of out invention has been described fully in order to explain its principles, it is understood that various modifications or alterations may be made to the preferred embodiment without departing from the scope of the invention as set forth in the appended claims.

We claim:

1. An annular gas turbine combustor liner for containing a hot combustor flow, said liner comprising:
a single wall annular shell having a hot surface and a cold surface and at least one continuous pattern of small closely spaced film cooling holes angled sharply in the downstream direction from said cold surface to said hot surface,
said continuous pattern effective to produce a cooling film extending substantially over the entire length of said shell,
said film cooling holes having a hole diameter, a downstream slant angle, and spaced at least sufficiently close enough together to effect a cooling film on said hot surface of said shell during combustor operation, and said film cooling holes being angled in a circumferential direction.

2. A gas turbine combustor liner as claimed in claim 1 wherein said circumferential direction coincides with a predetermined swirl angle of the flow.

3. A gas turbine combustor liner as claimed in claim 1 wherein the circumferential biased angle is in a range of between 30 and 65 degrees measured generally from a downstream component of the flow's direction in the combustor.

4. A gas turbine combustor liner as claimed in claim 1 wherein a portion of said shell is corrugated to form a shallow wavy wall cross-section.

5. A gas turbine combustor liner as closed in claim 3 wherein said film cooling holes have a downstream angle slanted from said cold surface of said shell to said hot surface of said shell and wherein said downstream angle has a value of about twenty degrees.

6. A gas turbine combustor liner as claimed in claim 3 wherein said film cooling holes have a downstream angle slanted from said cold surface of said shell to said hot surface of said shell and wherein said downstream angle has a value in a range of about twenty degrees.

7. A gas turbine combustor liner as claimed in claim 6 wherein a portion of said shell is corrugated to form a shallow wavy wall cross-section.

8. An afterburning gas turbine engine exhaust section combustor liner for containing a hot combustor flow, said exhaust section combustor liner comprising:
   a single wall sheet metal shell having a hot surface and a cold surface wherein a portion of said shell is corrugated to form a shallow wavy wall cross-section and
   at least one pattern of small closely spaced sharply downstream angled film cooling holes disposed through said shell having a downstream angle slanted from said cold surface of said shell to said hot surface of said shell wherein said downstream angle has a value of about twenty degrees and said film cooling holes are angled in a circumferential direction, said continuous pattern effective to produce a cooling film extending substantially over the entire length of said shell.

9. An afterburning gas turbine engine exhaust section combustor liner as claimed in claim 8 wherein said circumferential direction coincides with a predetermined swirl direction of the flow in the combustor.

10. A gas turbine combustor liner as claimed in claim 9 wherein the circumferential biased angle is in a range of between 30 and 65 degrees measured generally from a downstream component of the flow's direction in the combustor.

11. An afterburning gas turbine engine exhaust section combustor liner as claimed in claim 8 wherein said film cooling holes have a downstream angle slanted from said cold surface of said shell to said hot surface of said shell and wherein said downstream angle has a value of about fifteen degrees.

12. An afterburning gas turbine engine exhaust section combustor liner as claimed in claim 8 wherein said film cooling holes have a downstream angle slanted from said cold surface of said shell to said hot surface of said shell and wherein said downstream angle has a value in a preferred range of about between ten and twenty degrees.

* * * * *